(12) United States Patent
Sutardja

(10) Patent No.: US 7,725,182 B2
(45) Date of Patent: May 25, 2010

(54) POWER DISTRIBUTION SYSTEM FOR A MEDICAL DEVICE

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 698 days.

(21) Appl. No.: 11/324,450

(22) Filed: Jan. 3, 2006

(65) Prior Publication Data

US 2006/0267551 A1    Nov. 30, 2006

Related U.S. Application Data

(63) Continuation-in-part of application No. 11/216,843, filed on Aug. 31, 2005, now Pat. No. 7,610,498.

(60) Provisional application No. 60/685,915, filed on May 31, 2005, provisional application No. 60/708,903, filed on Aug. 17, 2005.

(51) Int. Cl.
*A61N 1/362* (2006.01)

(52) U.S. Cl. .............................. 607/9; 607/34

(58) Field of Classification Search ........................ 607/9
See application file for complete search history.

(56) References Cited

U.S. PATENT DOCUMENTS

| | | | |
|---|---|---|---|
| 3,631,860 A * | 1/1972 | Lopin | 607/30 |
| 3,748,500 A * | 7/1973 | Tam | 327/526 |
| 3,866,614 A * | 2/1975 | Svensson | 607/9 |
| 4,096,866 A * | 6/1978 | Fischell | 607/34 |
| 5,411,537 A | 5/1995 | Munshi et al. | |
| 5,571,141 A * | 11/1996 | McNeil et al. | 607/5 |
| 5,701,597 A | 12/1997 | Nakanishi et al. | |
| 5,814,972 A | 9/1998 | Shimada et al. | |
| 5,959,368 A | 9/1999 | Kubo et al. | |
| 6,130,813 A * | 10/2000 | Kates et al. | 361/93.1 |
| 6,160,702 A | 12/2000 | Lee et al. | |
| 6,218,810 B1 | 4/2001 | Matsumoto | |
| 6,223,077 B1 * | 4/2001 | Schweizer et al. | 607/5 |
| 6,262,494 B1 | 7/2001 | Tsukuni et al. | |

(Continued)

FOREIGN PATENT DOCUMENTS

DE    38 23 922 A1    1/1989

(Continued)

OTHER PUBLICATIONS

Communication from the European Patent Office dated Sep. 6, 2006 with the extended European Search Report for Application No. 06009374.7-2224; 6 pages.

(Continued)

*Primary Examiner*—Carl H Layno
*Assistant Examiner*—Jeremiah T Kimball

(57) ABSTRACT

A medical device includes a pulse generator that selectively generates pulses. A control module selectively controls the pulses A power distribution system supplies power to said medical device. The power distribution system includes N batteries, where N is an integer greater than one, a common node, and N protection modules. The N protection modules communicate with the control module, selectively connect a respective one of the N batteries to the common node based on control signals from the control module, and monitor current provided by the respective one of the N batteries. The control module generates the respective control signals based upon the current.

28 Claims, 14 Drawing Sheets

U.S. PATENT DOCUMENTS

| | | | |
|---|---|---|---|
| 2003/0151875 | A1 | 8/2003 | Nguyen et al. |
| 2004/0109374 | A1* | 6/2004 | Sundar ........................ 365/226 |
| 2004/0160213 | A1 | 8/2004 | Stanesti |
| 2004/0164708 | A1 | 8/2004 | Veselic et al. |
| 2006/0145538 | A1 | 7/2006 | Proefrock et al. |

FOREIGN PATENT DOCUMENTS

| | | |
|---|---|---|
| JP | 07049731 | 2/1995 |
| JP | 2001298952 | 10/2001 |
| WO | WO 99/33124 | 7/1999 |
| WO | WO 2004/025802 | 3/2004 |
| WO | WO 2004025802 A1 * | 3/2004 |

OTHER PUBLICATIONS

Communication from the European Patent Office dated Oct. 16, 2006 with the extended European Search Report for Application No. 06009378.8-2207; 7 pages.

Official Action including the Search Report and Written Opinion form the Intellectual Property Office of Singapore dated Jun. 22, 2007 for Application No. SG 200603157-9; 8 pages.

Official Action including the Search Report and Written Opinion form the Intellectual Property Office of Singapore dated Jun. 22, 2007 for Application No. SG 200603159-5; 9 pages.

Official Communication from the European Patent Office dated Jun. 22, 2007 for Application No. 06 009 374.7-2207; 1 page.

Official Communication from the European Patent Office dated Jun. 21, 2007 for Application No. 06 009 378.8-2207; 1 page.

* cited by examiner

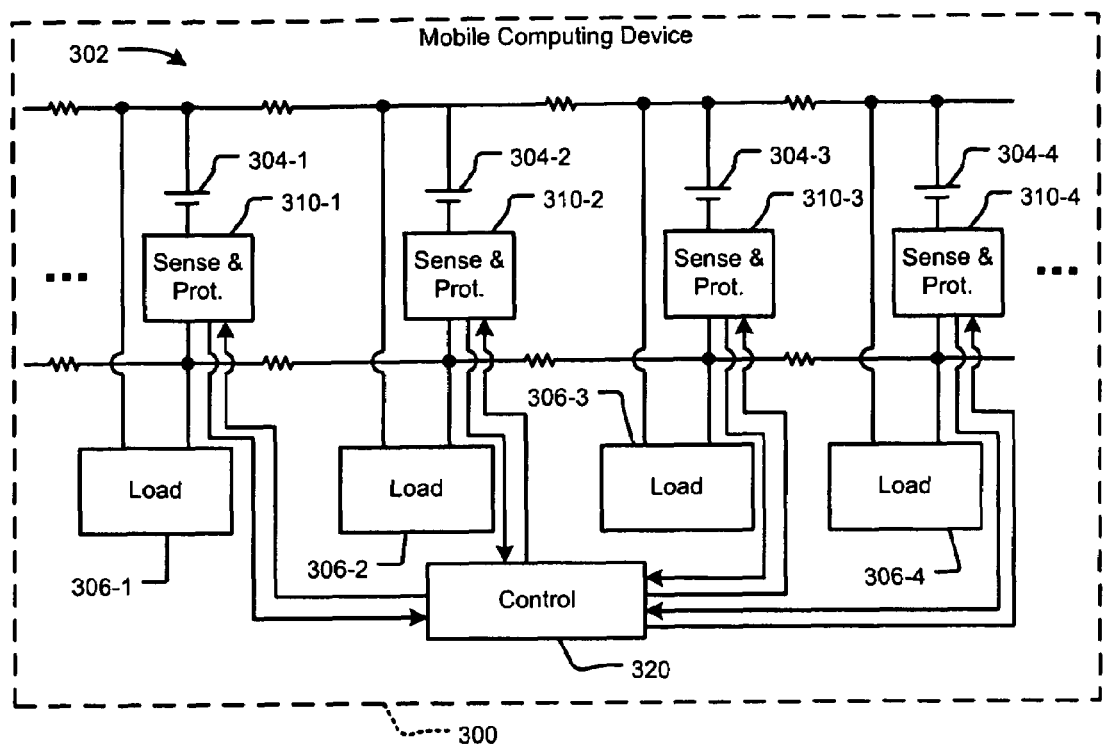
FIG. 15
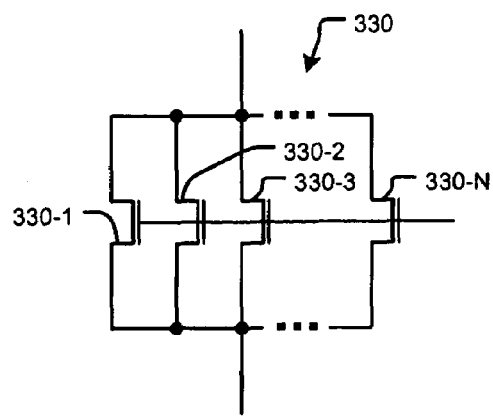
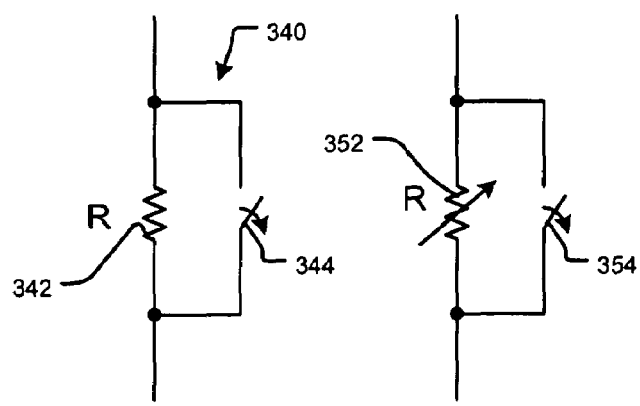
FIG. 16A    FIG. 16B    FIG. 16C

POWER DISTRIBUTION SYSTEM FOR A MEDICAL DEVICE

CROSS-REFERENCE TO RELATED APPLICATIONS

This application is a continuation in part of U.S. patent application Ser. No. 11/216,843, filed on Aug. 31, 2005 and claims the benefit of U.S. Provisional Application No. 60/685,915, filed on May 31, 2005 and U.S. Provisional Application No. 60/708,903, filed on Aug. 17, 2005. The disclosures of the above applications are incorporated herein by reference in their entirety.

FIELD OF THE INVENTION

The present invention relates to medical devices, and more particularly to power distribution systems for medical devices such as pacemakers.

BACKGROUND OF THE INVENTION

Pacemaker systems typically include a controller, a battery, a pulse generator and one or more leads. The pulse generator produces pacing pulses for a heart. The leads deliver the impulses to the heart and sense contractions of the heart. A programming module that is separate from the pacemaker system can be used by the doctor to alter the operation of the pacemaker system after it has been installed in a patient.

Some pacemaker systems operate on demand. In other words, the pacemaker system stands by until a natural rate of the upper and lower heart falls below a predetermined rate. When this situation occurs, the pacemaker system sends out pacing impulses to ensure that the heart contracts and pumps blood.

The battery, controller, and pulse generator may be packaged in a sealed housing. The leads typically extend from the sealed housing and have ends that are connected within chambers of the patient's heart. The leads are also typically employed to carry feedback signals from the heart. Using the feedback signals, the controller is able to monitor the heart's activity and trigger the pulse generator appropriately. The battery may be sealed inside of the housing or another component of the pacemaker system. The housing and/or other component is typically removed and the battery is replaced when the stored energy in the battery falls below a threshold. As can be appreciated, replacing the battery requires a patient to undergo additional surgery.

The leads typically include insulated wires that extend from the pulse generator in the housing through a vein to a heart chamber or chambers. The pacemaker system monitors the heart by sensing electrical signals received by the pulse generator through the leads. The signals that are received provide information relating to contraction of the heart chambers. This information is typically sufficient for the controller to decide when pulses are required.

Pacemaker systems exist for single chamber and dual chamber applications. A single chamber pacemaker system usually employs a single lead to carry signals to and from one chamber of the heart. Typically, the lead is connected to the right atrium or the right ventricle. This type of pacemaker is often selected for patients having an SA (sinoatrial) node that sends out signals too slowly but whose electrical pathway to the lower heart is in good condition.

A dual chamber pacemaker usually includes two leads. One lead is located in the right atrium and another lead is located in the right ventricle. This type of pacemaker system can monitor and deliver impulses to either or both of the heart chambers. The dual chamber pacemaker system is typically selected when the SA node signals are too slow and the electrical pathway is partly or completely blocked.

Adaptive rate pacemakers may also be used. Adaptive rate pacemakers typically include additional sensors that monitor the body's need for blood flow. By monitoring this information, the pacemaker can increase and/or decrease the pace to correct for when the heart's natural rate does not increase sufficiently for an increased level of activity.

SUMMARY OF THE INVENTION

A medical device comprises a pulse generator that selectively generates pulses. A control module selectively controls the pulses. A power distribution system supplies power to the medical device. The power distribution system includes N batteries, where N is an integer greater than one, a common node, and N protection modules that communicate with the control module. The N protection modules selectively connect a respective one of the N batteries to the common node based on control signals from the control module and monitor current provided by the respective one of the N batteries. The control module generates the respective control signals based upon the current.

In other features, the medical device further comprises first switch modules that selectively connect the common node to the pulse generator and the control module. The medical device comprises a pacemaker system and the pulses include heart pacing pulses. The control module comprises M control modules and the medical device further comprises first switch modules that selectively connect one of the M control modules to the pulse generator, where M is an integer greater than one. The first switch modules also selectively connect the one of the M control modules to one of the N protection modules. The pulse generator comprises P pulse generators and the medical device further comprises second switch modules that selectively connect one of the P pulse generators to the one of the M control modules, where P is an integer greater than one. The medical device further comprises leads and third switch modules that selectively connect the one of the P pulse generators to the leads.

In other features, the first switch modules comprise redundant switch modules. Each of the N protection modules comprises a current limiting module. The current limiting module comprises X transistors that are connected in parallel, where X is an integer greater than one, and wherein control terminals of the X transistors communicate with the control module. The current limiting module comprises a resistance element and a switch that is connected in parallel with the resistance element and that is selectively controlled by the control module. The resistance element comprises a variable resistance element and the control module selectively varies a resistance of the variable resistance element.

A medical device comprises pulse generating means for selectively generating pulses. The medical device comprises control means for selectively controlling the pulses and power distribution means. The power distribution means comprises N charge storing means for delivering current, where N is an integer greater than one, a common node, and N protection means for selectively connecting a respective one of the N charge storing means to the common node based on respective control signals from the control means and for monitoring current flowing through the respective one of the N charge storing means. The control means selectively generates the respective control signals based upon the current flowing through the N charge storing means.

In other features, the medical device further comprises first switching means for selectively connecting the common node to the pulse generator and the control module. The medical device comprises a pacemaker system and the pulses include heart pacing pulses. The control means comprises M control means for adjusting pulses and the medical device further comprises first switching means for selectively connecting one of the M control means to the pulse generating means, where M is an integer greater than one. The first switching means also selectively connects the one of the M control means to one of the N protection means. The pulse generating means comprises P pulse generating means and the medical device further comprises second switching means for selectively connecting one of the P pulse generating means to the one of the M control means, where P is an integer greater than one. The medical device further comprises leads and third switching means for selectively connecting one of the P pulse generating means to the leads.

In other features, each of the N protection means comprises current limiting means for limiting current. Each of the current limiting means comprises X transistors that are connected in parallel, where X is an integer greater than one, and wherein control terminals of the X transistors communicate with the control means. The current limiting means comprises resistance means for providing resistance and switch means for switching that is connected in parallel with the resistance means and that is selectively controlled by the control means. The resistance means comprises variable resistance means for providing a variable resistance and wherein the control means selectively varies a resistance of the variable resistance means.

A method for operating a medical device comprises selectively generating pulses using a pulse generator, controlling the pulses using a control module, selectively connecting at least one of a plurality of batteries to a common node, monitoring current flowing through each of the plurality of batteries, and selecting at least one of the plurality of batteries based upon the current flowing through the plurality of batteries.

In other features, the medical device comprises a pacemaker system and the pulses include heart pacing pulses. The control module includes M control modules and the method further comprises selectively connecting one of the M control modules to the pulse generator, where M is an integer greater than one. The pulse generator includes P pulse generators and the method further comprises selectively connecting one of the P pulse generators to one of the M control modules, where P is an integer greater than one. The one of the P pulse generators is selectively connected to leads. A resistance value of a resistance element connected to one of the plurality of batteries is selectively adjusted to adjust current provided therefrom.

A medical device comprises P pulse generators that selectively generate pulses for transmission to a patient. A power distribution system comprises N batteries. M control modules selectively control the pulses. L switch modules selectively connect a selected one of the P pulse generators, at least a selected one of the N batteries, and a selected one of the M control modules, wherein P, M, N and L are integers greater than one.

In other features, the control module monitors current supplied by the N batteries and selectively controls the L switch modules based thereon. N protection modules selectively vary current provided by the at least the selected one of the N batteries. N protection modules selectively limit current provided by the at least the selected one of the N batteries. The L switch modules include first switch modules that selectively connect the N batteries to a common node and second switch modules that selectively connect the common node to the P pulse generators and the M control modules.

In other features, the medical device comprises a pacemaker system and the pulses include heart pacing pulses. The medical device further comprises leads and third switch modules that selectively connect the selected one of the P pulse generators to the leads. Each of the N protection modules comprise a current limiting module. The current limiting modules comprise X transistors that are connected in parallel, where X is an integer greater than one, and wherein control terminals of the X transistors communicate with at least one of the M control modules. The current limiting module comprises a resistance element and a switch module that is connected in parallel with the resistance element and that is selectively controlled by the control module. The resistance element comprises a variable resistance element and the control module selectively varies a resistance of the variable resistance element.

A medical device comprises P pulse generating means for selectively generating pulses for transmission to a patient, a power distribution system comprising N current storing means for storing current, M control means for selectively controlling the pulses, and L switch means that selectively connect a selected one of the P pulse generating means, at least a selected one of the N current storing means, and a selected one of the M control means, wherein P, M, N and L are integers greater than one.

In other features, the control means monitors current supplied by the N current storing means and selectively controls the L switch means based thereon. The medical device further comprises N protection means for selectively varying current provided by the at least the selected one of the N current storing means. The medical device further comprises N protection means for selectively limiting current provided by the at least the selected one of the N current storing means. The L switch means include first switch means for selectively connecting the N current storing means to a common node and second switch means for selectively connecting the common node to the P pulse generating means and the M control means. The medical device comprises a pacemaker system and the pulses include heart pacing pulses. The medical device further comprises leads and third switch means for selectively connecting the selected one of the P pulse generating means to the leads.

In other features, each of the N protection means comprise a current limiting means for limiting current. The current limiting means comprises X transistors that are connected in parallel, where X is an integer greater than one, and wherein control terminals of the X transistors communicate with at least one of the M control means. The current limiting means comprises resistance means for providing resistance and switch means that is connected in parallel with the resistance means and that is selectively controlled by the control means. The resistance means comprises a variable resistance element and the control means selectively varies a resistance of the variable resistance element.

A method for operating a medical device comprises selectively generating pulses for transmission to a patient using P pulse generators, distributing power using N batteries, selectively controlling the pulse using M control modules, and selectively connecting a selected one of the P pulse generators, at least a selected one of the N batteries, and a selected one of the M control modules, wherein P, M, N and L are integers greater than one.

In other features, current supplied by the N batteries is monitored and the L switch modules are selectively controlled based thereon. The current provided by the at least the selected one of the N batteries is selectively varied. The current provided by the at least the selected one of the N batteries is selectively limited. The N batteries are selectively connected to a common node and the common node is selectively connected to the P pulse generators and the M control modules. The medical device comprises a pacemaker system and the pulses include heart pacing pulses. The selected one of the P pulse generators is selectively connected to leads.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a functional block diagram of a mobile computing device including a distributed power source and current sense and protection modules according to the present invention;

FIG. 16A is an exemplary electrical schematic of a current protection module;

FIG. 16B is an exemplary electrical schematic of another current protection module;

FIG. 16C is an exemplary electrical schematic of an active current protection module;

DETAILED DESCRIPTION OF THE PREFERRED EMBODIMENTS

Figure 1A:
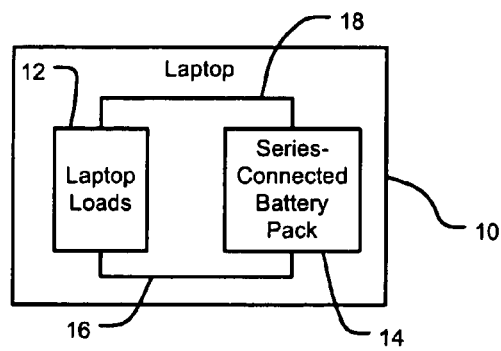
FIG. 1A is a functional block diagram of a laptop computer including a battery pack with batteries that are connected in series according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality. While the present invention will be described in conjunction with laptop computers and/or laptop loads, the present invention applies to any mobile digital computing device and/or mobile computing device load. As used herein, the term mobile computing device refers to digital devices that include at least one integrated circuit and that are capable of being powered by a mobile power source such as a battery or other portable power storage device. Examples of mobile computing devices include, but are not limited to, laptop computers, MP3 players, personal digital assistants (PDAs), and the like.

Figure 1B:
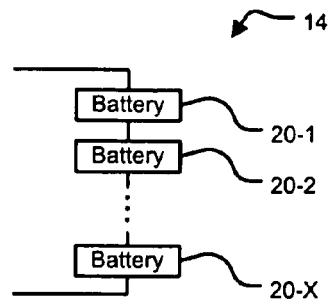
FIG. 1B is a functional block diagram of a plurality of batteries connected in series according to the prior art.
Figure 1C:
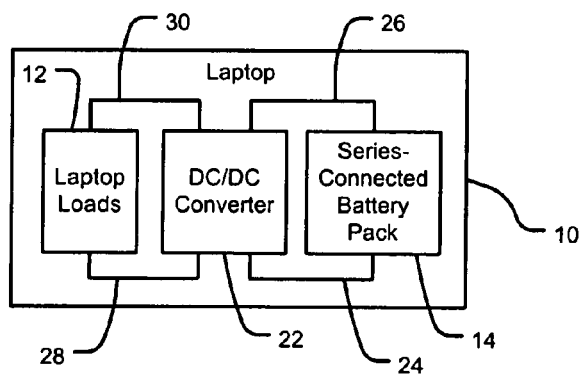
FIG. 1C is a functional block diagram of a laptop computer including a DC/DC converter and a battery pack according to the prior art.

Referring now to FIGS. 1A, 1B, and 1C, a mobile computing device according to the prior art, such as a laptop computer 10, includes one or more loads 12, such as laptop loads, and a battery pack 14 that powers the loads 12. The battery pack 14 includes batteries that are connected in series. The battery pack 14 functions as a centralized energy source for the laptop loads 12. In other words, the battery pack 14 provides current and voltage to the laptop loads 12 through conductors 16 and/or 18. One of the conductors 16 or 18 may be connected to a reference potential such as ground. In FIG. 1B, the battery pack 14 includes batteries 20-1, 20-2, . . . , and 20-X (collectively, batteries 20) that are connected in series, where X is greater than 1. In conventional battery pack designs, the batteries 20 are connected in series to increase voltage and decrease current.

The laptop 10 may include a DC/DC converter 22 as shown in FIG. 1C. The DC/DC converter 22 communicates with the battery pack 14 via conductors 24 and/or 26. The laptop loads 12 communicate with the DC/DC converter 22 via conductors 28 and/or 30. One or more of the conductors may be connected to a reference potential such as ground. In this manner, the DC/DC converter 22 receives a first voltage level from the battery pack 14 and outputs a second voltage level to the laptop loads 12. For example, the battery pack 14 may output a battery pack voltage such as 12V. The DC/DC converter 22 converts the battery pack voltage to a lower voltage level such as a 1V supply voltage for use by the laptop loads 12. In other words, the DC/DC converter 22 in this example is a step-down converter with a 12:1 conversion ratio. As described above, high conversion ratios tend to have relatively high conversion loss. Increasing the battery pack voltage decreases energy loss associated with parasitic distribution resistance at the expense of increasing loss due to conversion inefficiency.

Figure 2A:
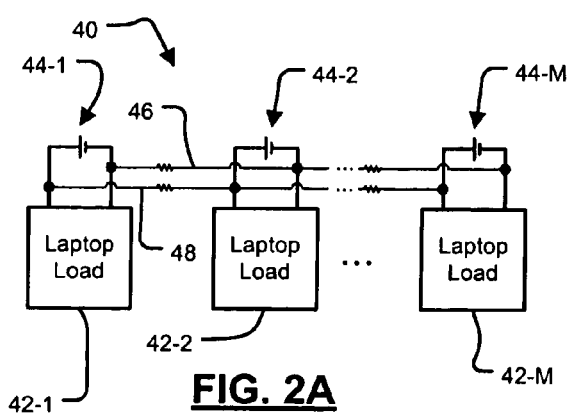
FIG. 2A is a schematic diagram of a parallel battery arrangement for a battery pack and laptop computer loads according to the present invention.

Referring now to FIG. 2A, a power distribution system 40 for a mobile computing device according to the present invention includes one or more distributed load centers 42-1, 42-2, . . . , and 42-M, (referred to collectively as load centers or loads 42). Each of the load centers 42 includes one or more loads. One or more distributed power sources such as batteries 44-1, 44-2, . . . , and 44-M, (referred to collectively as batteries 44) are connected in parallel with the loads 42. In other words, battery 44-1 is directly connected, and provides power, to the load 42-1. The battery 44-2 is directly connected, and provides power, to the load 42-2. The battery 44-M provides power to the load 42-M. The load centers 42 may include multiple loads. In other words, the number of batteries 44 and loads 42 need not be equal.

The parallel distributed arrangement of the batteries 44 allows power to be distributed to the loads in an optimal manner. For example, typical laptop computer subsystems include loads such as semiconductor loads and other types of loads that are physically dispersed throughout the laptop computer. In the present invention, each load 42 can receive power from an optimally-located battery 44. In contrast, the loads 12 (as shown in FIGS. 1A and 1C) receive power from a single, centrally-located battery pack 14.

The current requirements of the loads 42 may be imbalanced. For example, the load 42-1 may require more current than the load 42-2. To prevent uneven power consumption, the power distribution system 40 in one implementation includes one or more terminal connections 46 and 48. The terminal connections 46 and 48 may be any suitable conductive material that shorts the first terminals and the second terminals of the load centers 42 and/or batteries 44, respectively. In other words, the first terminal of the first battery is connected to the first terminals of other batteries in the battery pack. A similar approach is used for the second terminals. For example, the terminal connections 46 and 48 may include, but are not limited to, conductive wire and/or metal stiffeners connected to printed circuit board (PCB), power traces/planes (PT/P), and/or ground traces/planes (GT/P).

Figure 2B:
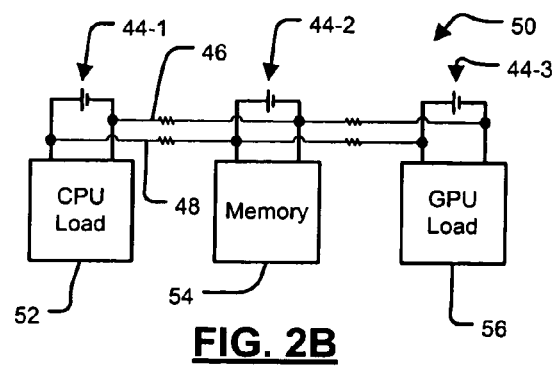
FIG. 2B is a schematic diagram of a parallel battery arrangement for central processing unit (CPU), memory and graphics processing unit (GPU) loads according to one implementation of the present invention.

Referring now to FIG. 2B, an exemplary power distribution system 50 includes a central processing unit (CPU) load 52, a memory load 54, and a graphics processing unit (GPU) load 56. The CPU load 52, the memory load 54, and the GPU load 56 may have different current requirements. The terminal connections 46 and 48 allow the different loads to receive power from one or more of the batteries 44.

Figure 3C:
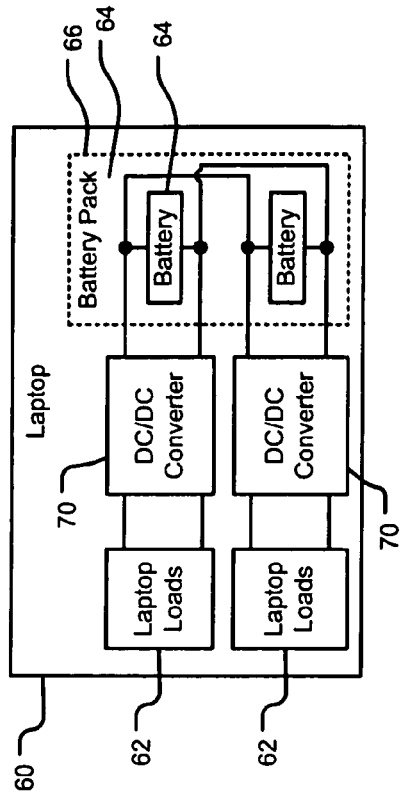
FIG. 3C is a functional block diagram of a parallel battery arrangement including battery terminals that are connected in parallel and DC/DC converters according to the present invention.
Figure 3D:
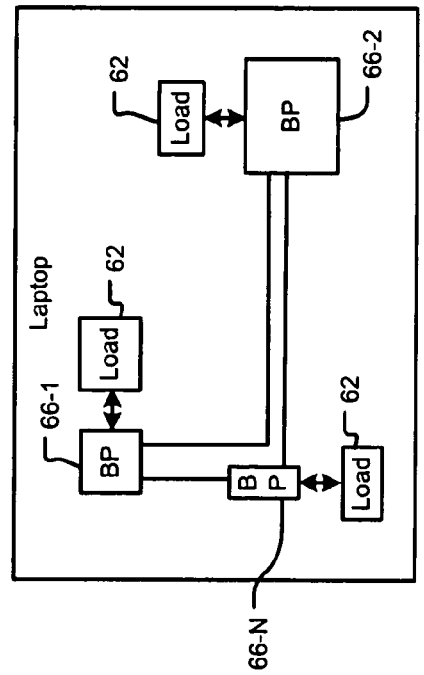
FIG. 3D illustrates the arrangement of battery packs having different dimensions in a mobile computing device.
Figure 3A:
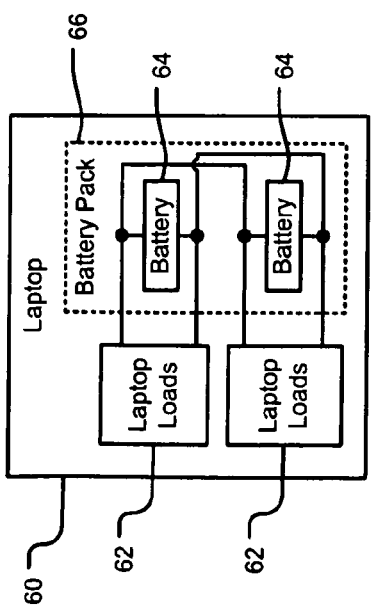
FIG. 3A is a functional block diagram of a parallel battery arrangement including battery terminals that are connected in parallel according to the present invention.

Referring now to FIG. 3A, a laptop computer 60 according to a first exemplary implementation of the present invention is shown. The laptop computer 60 includes loads 62 and batteries 64 that are connected in a parallel distribution arrangement. The batteries 64 are incorporated in a battery pack 66. The batteries 64 provide power to the loads 62 by way of multiple corresponding connections between the battery pack 66 and the loads 62. The batteries 64 are connected (as described in FIGS. 2A and 2B) within the battery pack 66.

Although the battery pack 66 is shown located within the laptop computer 60, those skilled in the art can appreciate that the battery pack 66 may be located externally to the laptop computer 60. Further, the laptop computer 60 may include a plurality of battery packs 66 each including plural batteries connected in parallel as described above. For example, the laptop computer 60 may include battery packs 66 that are physically located on opposite sides of the laptop computer 60.

The parallel distribution arrangement of the loads 62 and the batteries 64 is advantageous to the manufacture of the battery pack 66. A battery pack that is connected in series with a load typically includes a plurality of batteries that are connected in series. One or more of the batteries may have a smaller capacity than the other batteries in the battery pack. In this arrangement, a smaller-capacity (i.e. weaker) battery may self-reverse charge when larger-capacity (i.e. stronger) batteries are discharging. As a result, the smaller-capacity battery is damaged, thereby decreasing the overall capacity of the battery pack. Each battery must be charged and discharged to determine actual storage capacities and to avoid including batteries with nonequivalent capacities within a battery pack.

The parallel distribution arrangement of the present invention eliminates manufacturing time and costs that are associated with balancing battery capacity. In a parallel battery pack arrangement, current is naturally distributed from the battery pack 66 to the loads 62. A stronger battery will provide more current than a weaker battery within the same battery pack, negating the possibility of reverse charging the weaker battery. As a result, the overall battery pack lifetime will increase and the maximum capacity of the battery pack 66 is used more effectively. For example, one or more of the batteries 64 may be discharged to a minimum voltage specification to fully exploit the energy of the battery pack and reverse charging will not occur. Similarly, the parallel distribution arrangement provides increased reliability. When one of the batteries 64 weakens over time, the stronger battery is able to supplement or replace the energy output of the weaker battery. Therefore, the overall capacity of the battery pack 66 is not significantly reduced.

Figure 3B:
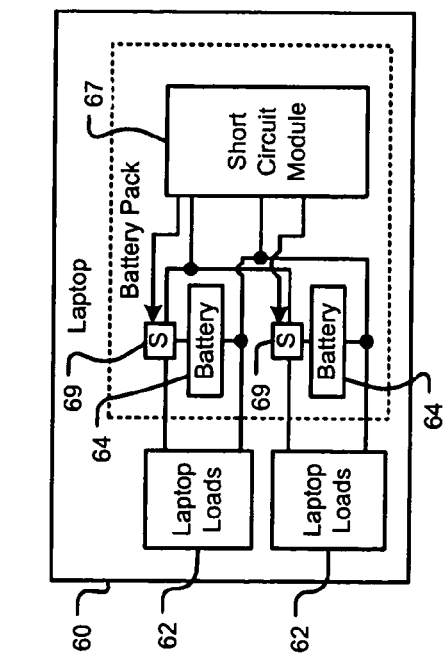
FIG. 3B illustrates the battery of FIG. 3A with a short circuit detecting module.

Referring now to FIG. 3B, the battery pack 66 may incorporate a short circuit detecting module 67 that isolates the batteries 64 when a short circuit condition is present. In other words, the short circuit detecting module 67 monitors the battery pack to determine if the terminals of a battery are shorted and/or if the first terminal of a battery is shorted to the second terminal of another battery. The short circuit detecting module 67 may selectively change a position of switches or contactors 69 to isolate a battery.

The laptop computer 60 may also include one or more DC/DC converters 70 as shown in FIG. 3C. As described above with respect to FIG. 1C, the DC/DC converters 70 convert the higher voltages of the batteries 64 to lower voltages suitable for the loads 62. However, due to the parallel distribution arrangement of the laptop computer 60, the conversion ratio of the DC/DC converters 70 is reduced. For example, the DC/DC converters 70 may have less than a 4:1 conversion ratio. In other implementations, the conversion ratio is less than or equal to 3:1, 2:1 and/pr 1:1. Further, each of the DC/DC converters may have a different conversion ratio. As such, the overall efficiency of the laptop computer 60 is improved.

Certain semiconductor loads of the laptop computer 60 may require higher operating frequencies. For example, at an operating frequency of approximately 1 MHz, external passive components may be smaller and less expensive than comparable components operating with low frequency DC/DC converters. In the parallel distribution arrangement, the DC/DC converters 70 may operate at different frequencies. As a result, one of the DC/DC converters 70 may operate at a higher frequency (i.e. between 1 MHz and 4 MHz).

Referring now to FIG. 3D, the laptop computer 60 may include batteries of different sizes in a parallel arrangement to further take advantage of this feature. For example, small form factor laptop computers may maximize available areas for fitting the batteries and/or battery packs 66 each with one or more batteries. In one implementation, the laptop computer 60 may include a first battery pack 66-1 having a first set of dimensions and/or shape, a second battery pack 66-2 having a second set of dimensions and/or shape, and an $n^{th}$ battery pack 66-N having an $n^{th}$ set of dimensions and/or shape. The battery packs are arranged adjacent to their primary loads 62. Each of the battery packs 66 includes one or more batteries. The battery packs 66 are connected together and/or to ground to allow load sharing as described above.

In another implementation, the laptop computer 60 may include a battery and/or battery pack having an irregular size and/or shape. In still another implementation, the laptop computer 60 may include multiple mounting positions for batteries and/or battery packs to allow flexible battery pack placement. For example, a first battery pack may be mounted on a top side of the laptop computer 60 and a second battery pack may be mounted on a bottom side of the laptop computer 60. Alternatively, a plurality of battery packs may be mounted along an edge of the laptop computer 60 and/or at corners of the laptop computer 60.

Figure 4A:
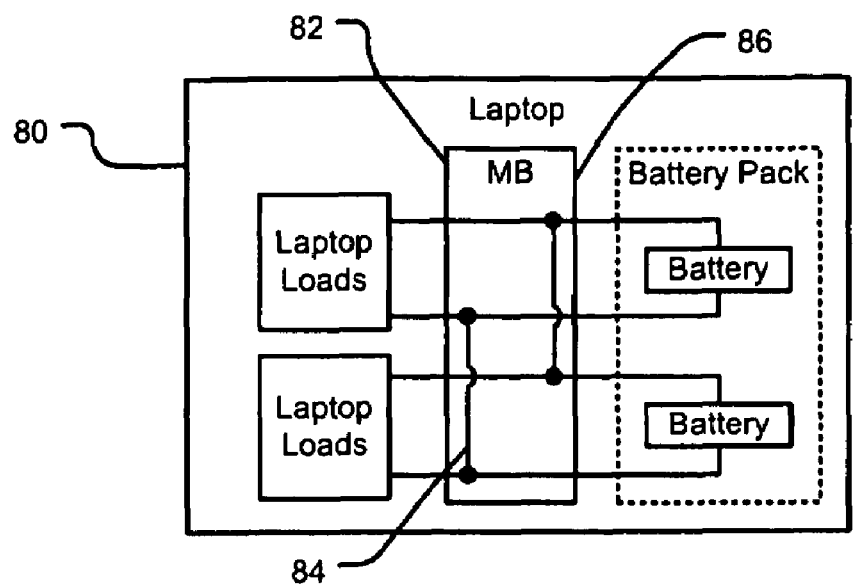
FIG. 4A is a functional block diagram of a parallel battery arrangement incorporating terminal connecting conductors on a motherboard according to the present invention.
Figure 4B:
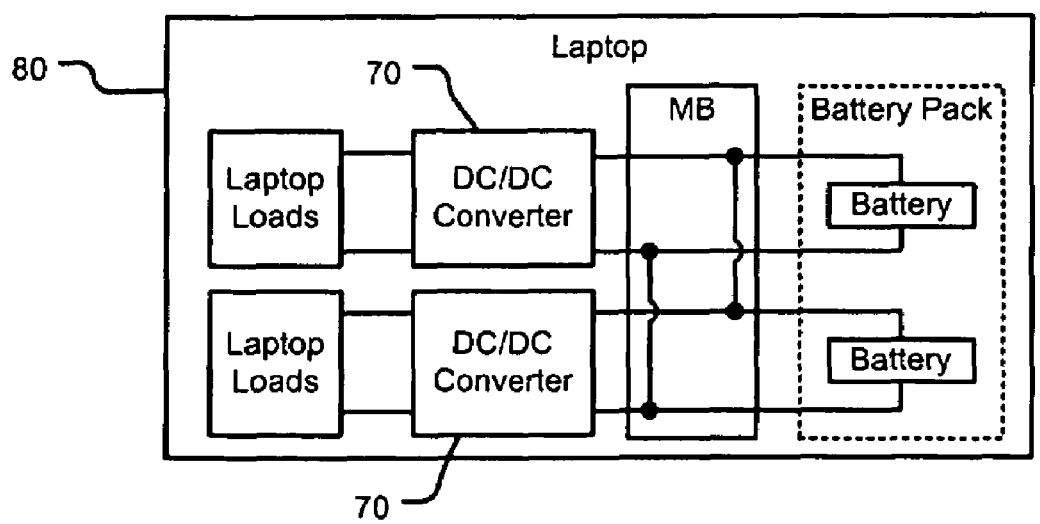
FIG. 4B is a functional block diagram of a parallel battery arrangement incorporating terminal connecting conductors on a motherboard and DC/DC converters according to the present invention.
Figure 5A:
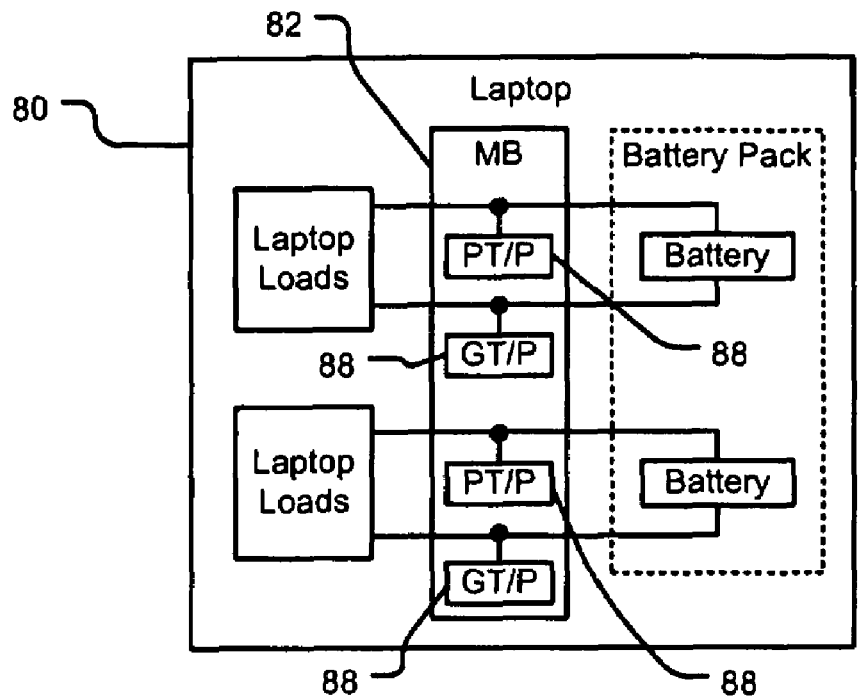
FIG. 5A is a functional block diagram of a parallel battery arrangement incorporating shorting metal stiffeners to ground and power planes on a motherboard according to the present invention.
Figure 5B:
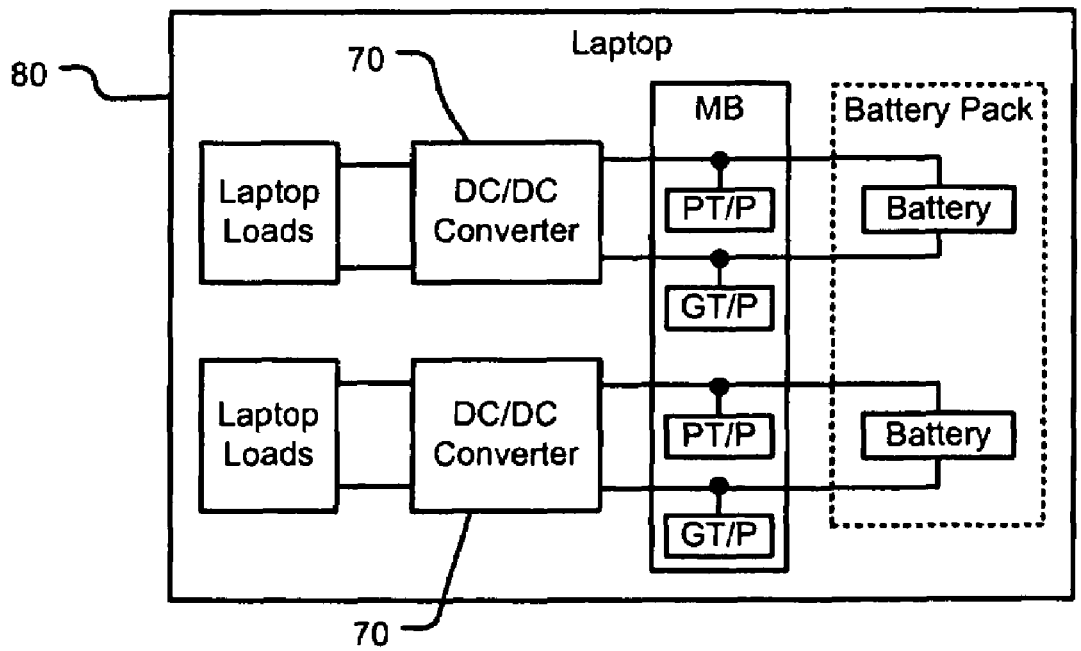
FIG. 5B is a functional block diagram of a parallel battery arrangement incorporating shorting metal stiffeners to ground and power planes on a motherboard and DC/DC converters according to the present invention.

Referring now to FIGS. 4A and 5A, a laptop computer 80 includes a motherboard 82. In this implementation, parallel connections between the batteries (as described above) are incorporated on the motherboard 82. For example, the terminal shorting connections may include connecting conductors 84 and 86 as shown in FIG. 4A. Alternatively, the terminal shorting connections may include metal stiffeners 88 that are connected to the PT/P and/or the GT/P of the motherboard 82. Referring now to FIGS. 4B and 5B, the laptop computer 80 may include one or more DC/DC converters 70 as described in previous implementations.

Figure 6:
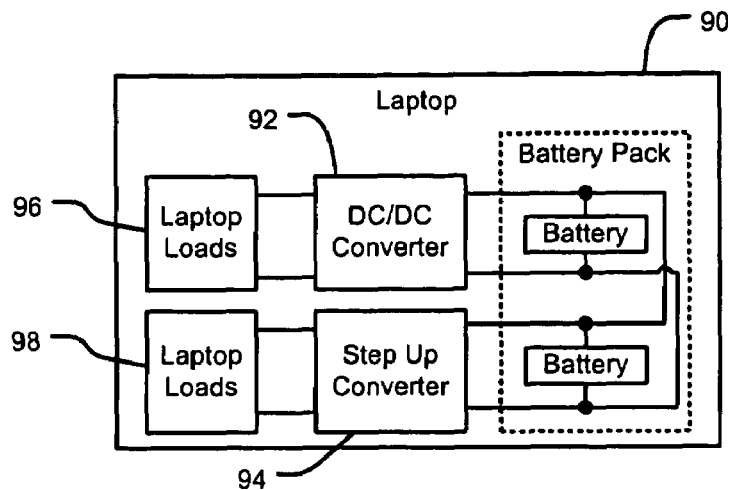
FIG. 6 is a functional block diagram of a parallel battery arrangement that includes a DC/DC converter and a step-up converter according to the present invention.
Figure 7:
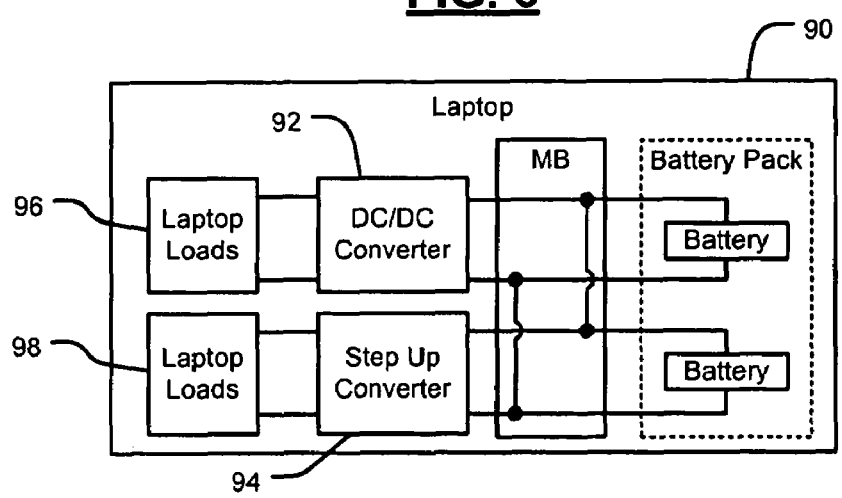
FIG. 7 is a functional block diagram of a parallel battery arrangement that includes a DC/DC converter and step-up converter according to the present invention.
Figure 8:
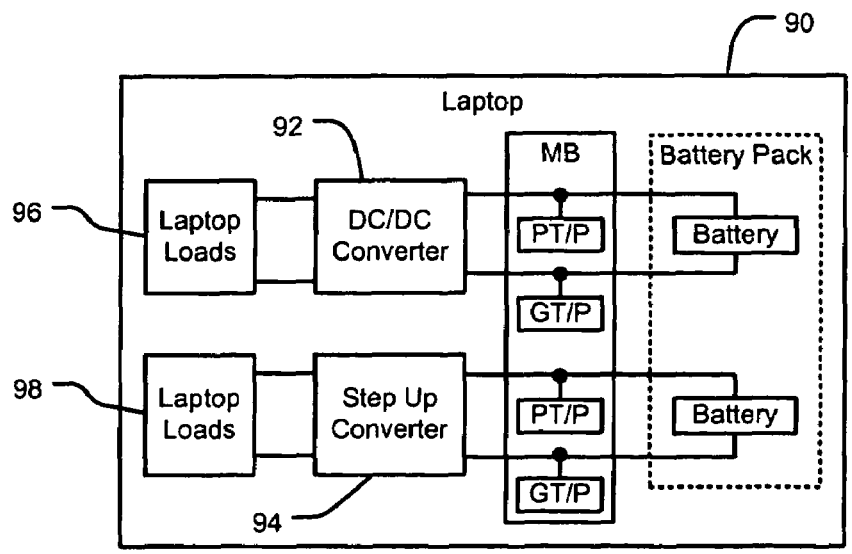
FIG. 8 is a functional block diagram of a parallel battery arrangement that includes a DC/DC converter and a step-up converter according to the present invention.

Referring now to FIGS. 6, 7, and 8, a laptop computer 90 may also include a step-down DC/DC converter 92 and a step-up DC/DC converter 94. Semiconductor devices in laptop computers may have relatively low voltage requirements. However, certain semiconductor devices may require higher voltages. For example, the laptop computer 90 may include a first load 96 and a second load 98. The first load 96 may require a first voltage, such as 1V. The second load 98 may require a second voltage that is greater than the first voltage, such as 5V. If the batteries provide a battery voltage output that is less than 5V and greater than 1V, step up and step down converters may be used. In the present implementation, the step-up DC/DC converter 94 boosts the voltage of the battery pack 66 to a voltage suitable for the second load 98.

Figure 9:
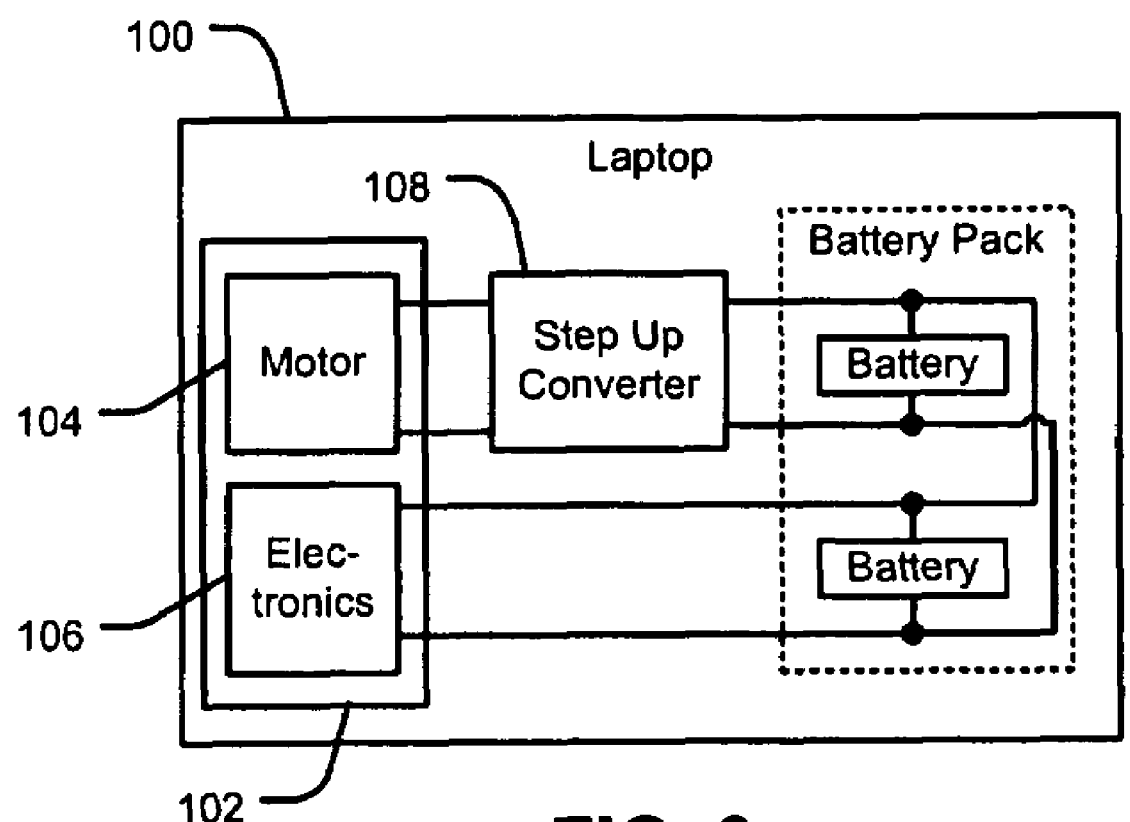
FIG. 9 is a functional block diagram of a parallel battery arrangement that includes peripheral devices and a step up converter.

In another implementation, the laptop computer 100 may include one or more peripheral devices 102 (e.g., a hard disk drive (HDD) or a DVD drive) that have more than one voltage requirement as shown in FIG. 9. For example, the peripheral device 102 may require a first voltage of 5V for a mechanical element such as a motor 104. The peripheral device 102 may require a second, lower voltage for another electronic element 106. In the present invention, the electronic element 106 may be able to operate at a range of supply voltages. For example, the electronic element 106 may operate on power from a single LiOn battery source or a supply voltage of 5V. In conventional systems that operate at 5V in a series arrangement, the electronic element 106, as well as the mechanical element 104, operate at 5V.

However, the peripheral device 102 may also operate in a parallel distribution arrangement in the laptop computer 100. In this manner, the laptop computer 100 includes a step-up DC/DC converter 108 that provides 5V to the mechanical element 104. A second step-up DC/DC converter is not required for the electronic element 106. In other words, the electronic element 106 is configured to operate at a lower supply voltage as well as operate at 5V, which negates the need for an additional step-up DC/DC converter.

Figure 10:
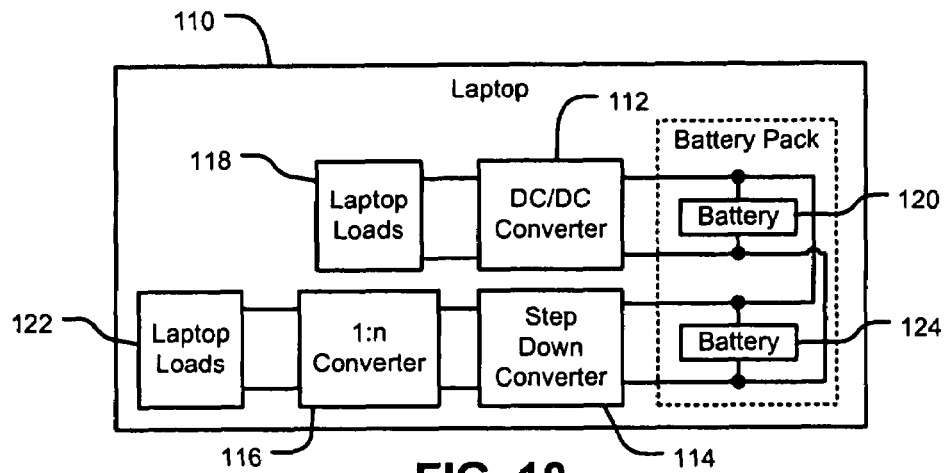
FIG. 10 is a functional block diagram of a parallel battery arrangement that includes single and two-stage converters according to the present invention.
Figure 11:
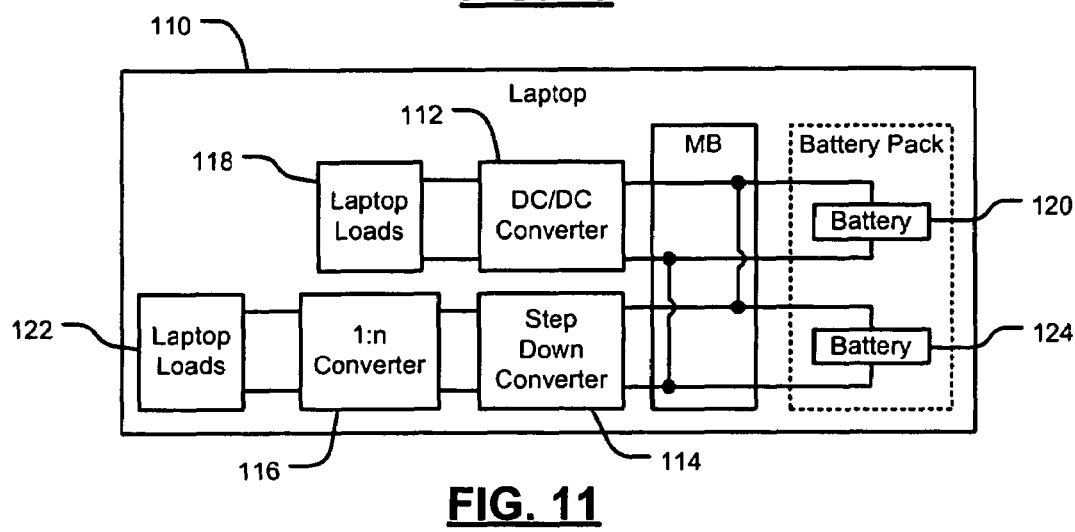
FIG. 11 is a functional block diagram of a parallel battery arrangement that includes single and two-stage converters according to the present invention.
Figure 12:
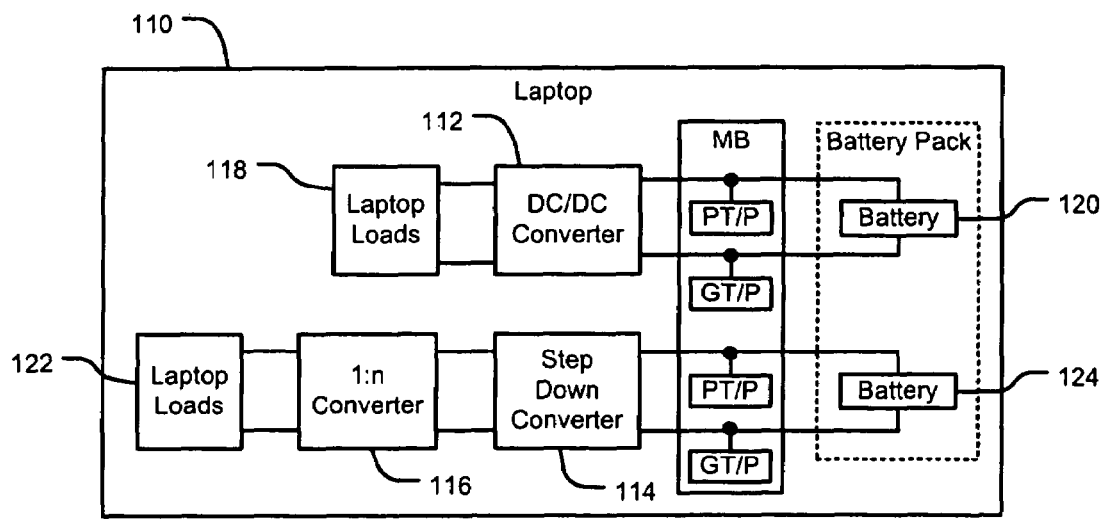
FIG. 12 is a functional block diagram of a parallel battery arrangement that includes single and two-stage converters according to the present invention.

Referring now to FIGS. 10-12, a laptop computer 110 converts a battery voltage to a 5V supply voltage according to a two-stage DC/DC conversion process. In some implementations, the battery is a Lithium-Ion battery, although other types of batteries may be used. The laptop computer 110 includes a DC/DC converter 112, a step-down DC/DC converter 114, and a 1:n step-up DC/DC converter 116. The DC/DC converter 112 may be a step-down or step-up converter according to the voltage requirements of the load 118. The DC/DC converter 112 converts the voltage of a battery 120 as described in previous implementations.

The use of a step-up boost converter may be less desirable for certain high current applications. For example, the voltage of the battery 124 may be between 2.7V and 4.2V. The step-down DC/DC converter 114 first converts the voltage of a battery 124 to a lower voltage. For example, the step-down DC/DC converter 114 converts the voltage of the battery 124 to 2.5V. The step-up DC/DC converter 116 subsequently converts the lower voltage to a higher voltage suitable for the load 122. For example, the step-up DC/DC converter 116 has a 1:2 conversion ratio and converts the output of the step-down DC/DC converter 114 to 5V. For higher voltage requirements, the step-up DC/DC converter 116 may have a 1:n conversion ratio as necessary.

Those skilled in the art can now appreciate from the foregoing description that the broad teachings of the present invention can be implemented in a variety of forms. The present invention may incorporate other known battery pack and/or power supply configurations in a parallel battery distribution. For example, a power supply or battery pack may implement a parallel battery distribution with universal serial bus (USB) technology according to any of the implementations described herein.

Figure 13:
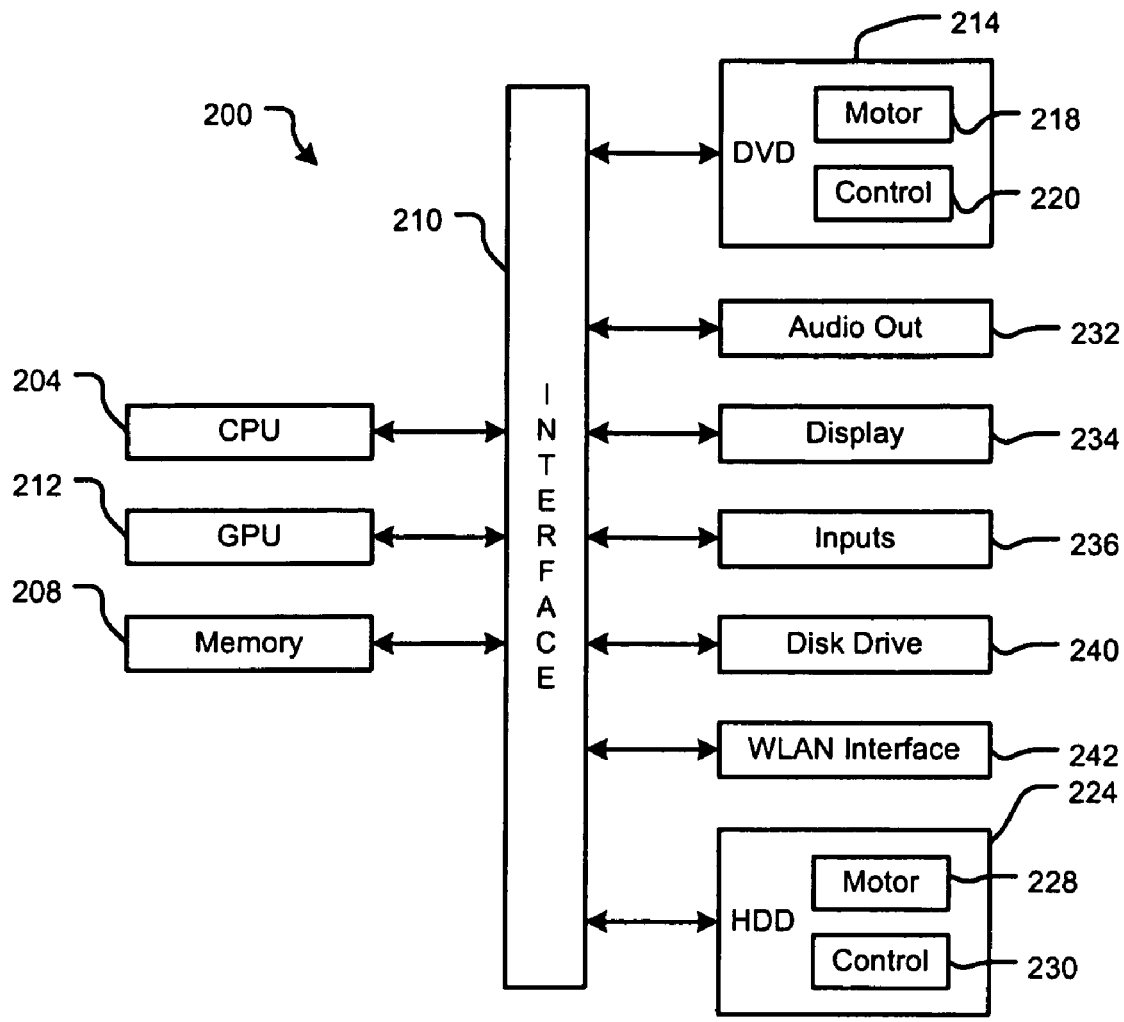
FIG. 13 is a functional block diagram of an exemplary mobile computing device with loads.

Referring now to FIG. 13, an exemplary mobile computing device 200 with loads is shown. The mobile computing device 200 includes a central processing unit (CPU) 204, memory 206 (such as random access memory, read only memory, and/or other suitable electronic storage) and an input/output (I/O) interface 210. The device 200 may further include a graphics processing unit (GPU) 212. The mobile computing device 200 may include one or more peripheral devices such as a DVD drive 214, which includes one or more motors 218 and control 220. Additional peripheral devices may include a hard disk drive (HDD) 224, which may include one or more motors 228 and a control module to 230. The device 200 may include an audio output 232 such as an audio output jack or speaker. The device may include a display 234, inputs 236, a disk drive 240 and/or a wireless local area network interface 242. The inputs 236 may include audio input, a microphone, a kepypad, buttons, touch pad and/or other inputs. Components of the device 200 may be grouped into one or more distributed load centers and supplied in the manner described above.

Figure 14:
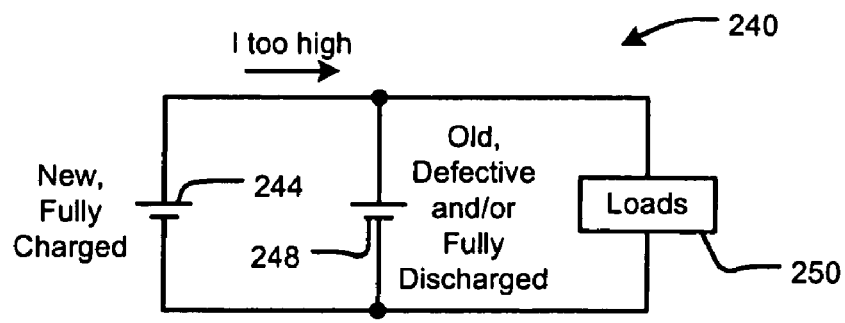
FIG. 14 illustrates current surge in mismatched batteries according to the prior art.

Referring now to FIG. 14, current surge in mismatched batteries according to the prior art is shown. A circuit 240 includes a first battery 244 and a second battery 248. The batteries 244 and 248 are connected in parallel and supply one or more loads 250. As can be appreciated, if the first battery 244 is a new and/or fully charged battery and the second battery 248 is in old, defective and/or fully discharged battery, current flowing to the second battery 248 may be too high and cause damage and/or other hazards.

Referring now to FIG. 15, a mobile computing device 300 includes a distributed power source 302 and current sense and protection modules according to the present invention. The device 300 includes batteries 304-1, 304-2, 304-3, and 304-4 (collectively batteries 304) that primarily supply loads 306-1, 306-2, 306-3, and 306-4 (collectively loads 306), respectively. Sensing and protection modules 310-1, 310-2, 310-3, and 310-4 (collectively sensing and protection modules 310) are connected to the batteries 304-1, 304-2, 304-3, and 304-4, respectively. The sensing and protection modules 310-1, 310-2, 310-3, and 310-4 sense current flowing through the batteries 304-1, 304-2, 304-3, and 304-4 in any suitable manner and limit current as will be described below. A control module 320 communicates with the sensing and protection modules 310, receives a sensed current signal, and generates one or more control signals to control current flowing through the batteries 304. While four battery/load/sensing and protection module pairs are shown, additional or fewer pairs may be used in a particular implementation.

Referring now to FIG. 16A, a current protection module 330 is shown. The current protection module 330 includes a plurality of transistors 330-1, 330-2, 330-3, . . . , and 330-N. When current flowing through a respective battery is sufficiently low, the transistors 330 are turned on. When current exceeds a threshold, the transistors 330 are modulated and/or turned off to adjust a resistance $R_{DS}$ provided by each transistor 330. Some of the transistors can be selectively turned on while others are off. While parallel arrangement is shown, a series arrangement can also be used.

Referring now to FIG. 16B, another current protection circuit 340 includes a resistance 342 and a parallel connected switch 344. The switch 344 is normally closed. When current through a respective battery increases above a threshold, the switch 344 is opened to increase series resistance by adding the resistance 342. As a result, current flowing through the battery decreases.

Referring now to FIG. 16C, another current protection circuit 350 shown to include a variable resistance 352 and a parallel connected switch 354. The switch 354 is normally closed. When current through the battery increases above a threshold, the switch is opened to increase series resistance by adding the variable resistance 352. The resistance that is provided may be adjusted by the control module 320. As a result, current flowing through the battery decreases.

In some implementations, the batteries may be single cell batteries. The resistances can be implemented using resistors, transistors or other suitable components. The switches may be implemented using transistors or other suitable components.

Figure 17:
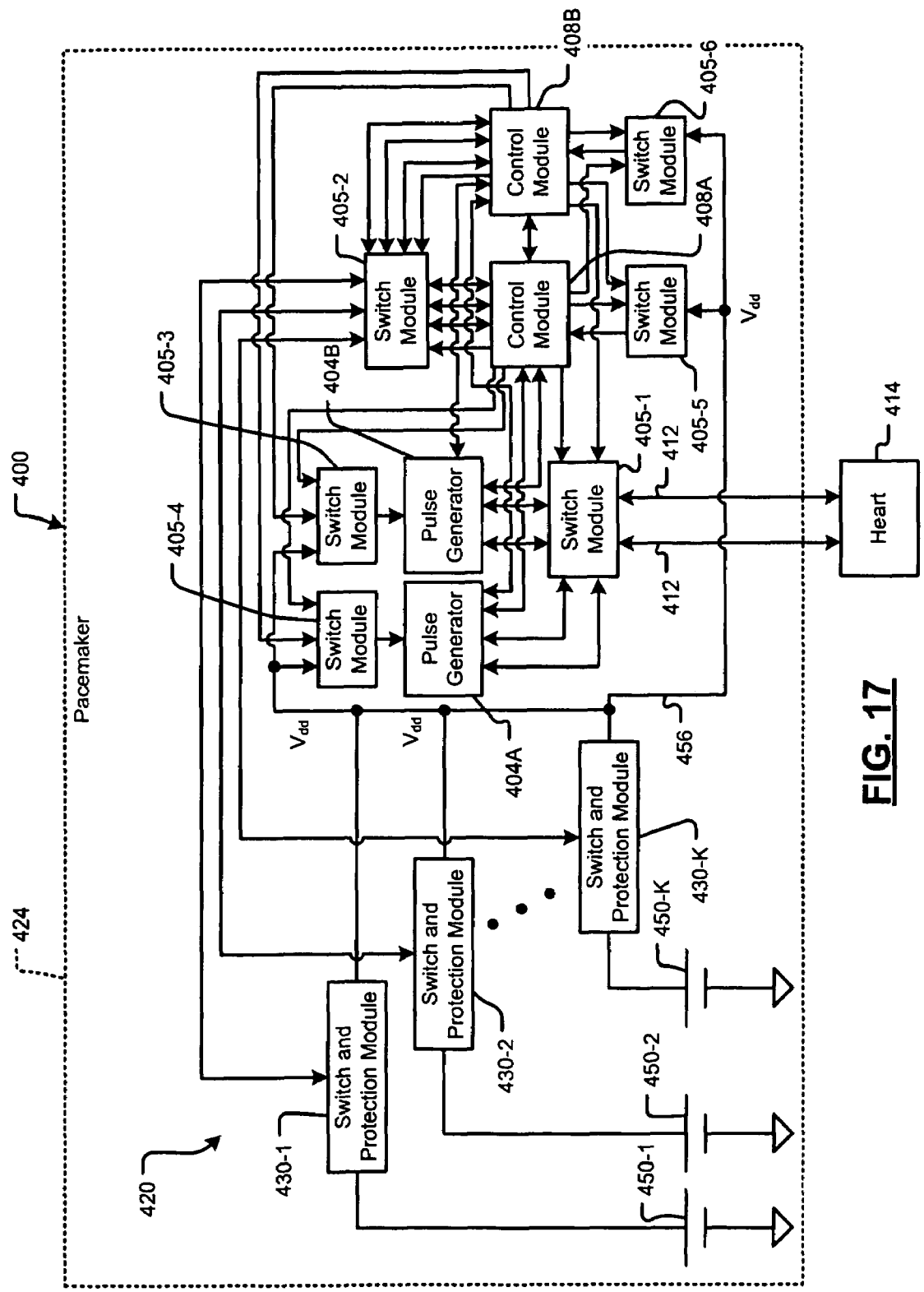
FIG. 17 is a functional block diagram of a power delivery system for medical device such as a pacemaker system.

Referring now to FIG. 17, a medical device such as a pacemaker system 400 is shown. The pacemaker system 400 is fully redundant. In other words, a bad or low battery can be isolated reliably from good or charged batteries. A bad or inoperable circuit such as a control module or pulse generator can be reliably isolated from good or operable circuits. Outputs of selected control modules and/or pulse generators can be reliably combined to allow redundancy. As a result, the reliability of the pacemaker system 400 can be improved.

The pacemaker system 400 includes pulse generators 404A and 404B (collectively, pulse generators 404), switch modules 405-1, 405-2, . . . , 405-6 (collectively, switch modules 405) and control modules 408A and 408B (collectively, control modules 408). One or more leads 412 connect a selected pulse generator 404 to a patient's heart 414. A sealed housing 424 may be used to house components of the medical device. The pulse generators 404 and control modules 408 may be integrated into one or more combination modules. Furthermore, the switch modules 405, control modules 408, and/or the pulse generators 404 can be combined into one or more integrated circuits.

A selected one of the control modules 408 controls a first switch module 405-1, which selects an output of one of the pulse generators 404. The selected pulse generator 404 is then connected by the switch module 405-1 to the leads 412. The pulse generators 404 receive and process signals generated by the patient's heart 414 and selectively deliver heart pacing pulses to the heart 414 as directed by the selected one of the control modules 408.

A second switch module 405-2 connects one of the switch and protection modules 430-1, 430-2, . . . 430-K (collectively, switch and protection modules 430) to one or more of the control modules 408. When problems are detected with one of the control modules 408 or one of the pulse generators 404, switch modules 405-2 and 405-1, respectively, can be actuated to select the other pulse generator 404 or control module 408.

A power distribution system 420 includes a plurality of batteries 450-1, 450-2, . . . , and 450-K (collectively, batteries 450) that can be connected in parallel. The power distribution system 420 also includes the switch and protection modules 430. Each switch and protection module 430 communicates with one or more of the control modules 408 via the second switch module 405-2 and selectively connects one or more of the batteries 450 to a common voltage rail or node 456. The common voltage rail 456 provides power to switch modules 405-3, 405-4, 405-5 and 405-6, which selectively provide power to the pulse generators 404A and 404B and the control modules 408A and 408B, respectively, of the pacemaker system 400.

The switch and protection modules 430 may sense current flowing from the respective battery 450 and/or voltage across the respective battery 450. This current and/or voltage information is communicated to the control modules 408. The control modules 408 direct the switch and protection modules 430 to connect and/or disconnect the respective batteries 450 as needed. The control modules 408 may also instruct the switch and protection modules 430 to actively adjust current flow from the batteries 450 using an approach described above in conjunction with FIGS. 16A-16C.

The control modules 408 may test one of the batteries 450 to ensure sufficient charge prior to switching it onto the common voltage rail 456. The control modules 408 may measure, calculate, and store states of charge of each battery. The states of charge may be based on open circuit voltage, load testing (e.g., sequentially connecting and measuring high-resistance and low-resistance dummy loads), and/or other suitable approaches.

The control modules 408 selectively connect respective batteries 450 to the common voltage rail 456 as needed. In some implementations, a single battery 450 is connected until its reserve power falls below a threshold. When the selected battery 450 fails to provide sufficient power, the control modules 408 then disconnects the battery 450 and simultaneously connects another battery. Capacitive and/or inductive circuits and/or filters may be provided to temporarily power the device during switching to another battery. In other implementations, more than one battery 450 can be active at a time, and the control modules 408 may then adjust and/or limit total power and/or total current to a predetermined level.

The ability to provide additional batteries 450 in the pacemaker system 400 increases the life of the pacemaker system 400. The redundancy also improves reliability and increases battery life. As a result, the pacemaker system 400 may function in a patient for longer periods of time. The switch and protection modules 430 provide additional safety when using multiple batteries 450 by limiting excess current. The control modules 408A and 408B may be connected together and exchange information. For example, both can be active at all times. One can operate as an active processor and another can be a watchdog processor. The watchdog processor may send predetermined data to the active processor and check the returned data to diagnose operability of the active processor. If the active processor does not respond correctly, the watchdog processor and/or another control module may become the active processor.

Figure 18:
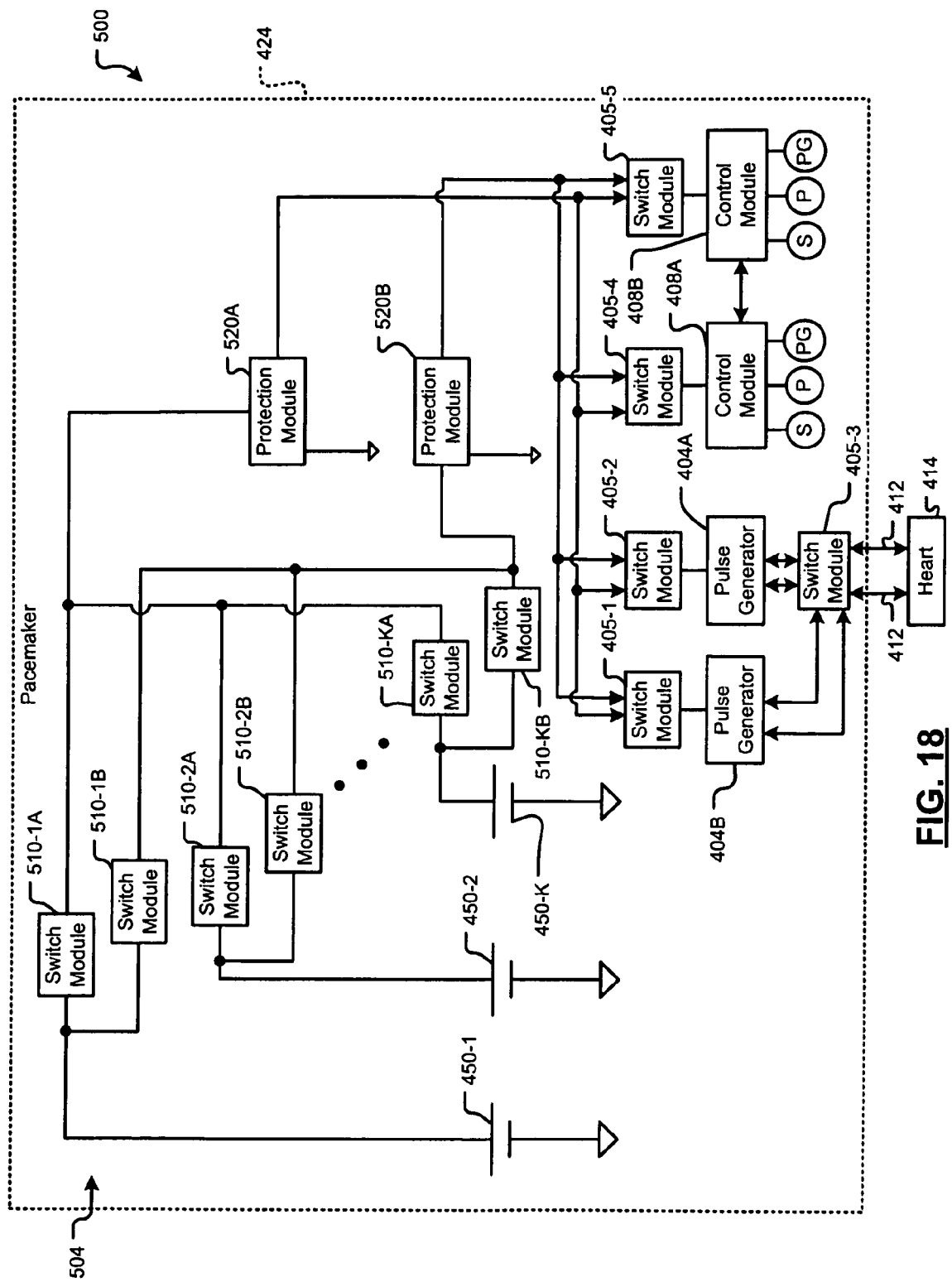
FIG. 18 is a functional block diagram of an alternate power delivery system for a medical device such as a pacemaker system.

Referring now to FIG. 18, an alternate pacemaker system 500 is shown, which includes the pulse generator modules 404, the switch modules 405, the control modules 408, the leads 412, a power distribution system 504, and the sealed housing 424 that are arranged in an alternate configuration. A first switch module 405-3 selects one of the pulse generators 404. The selected pulse generator 404 is connected to the leads 412. The pulse generators 404 receive and process signals generated by the patient's heart 414 and selectively deliver impulses to the heart 414 as directed by the control modules 408.

The control modules 408A and 408B are connected to the switch modules 405, protection modules 520A and 520B (collectively, protection modules 520) and/or the pulse generators 404 as generally shown at "S", "P" and "PG" in FIG. 18. The protection modules 520A and 520B are connected by switch modules 405-1, 405-2, 405-4 and 405-5 to the pulse generators 404A and 404B and the control modules 408A and 408B. When problems are detected with one of the control modules 408 or one of the pulse generators 404, switch modules 405 can be adjusted to select another pulse generator 404 or control module 408.

The power distribution system 504 includes the plurality of batteries 450 and switch modules 510. The batteries 450 are each selectively connected to the first protection module 520A by respective switch modules 510-1A, 510-2A, . . . , and 510-KA. Additionally, the batteries 450 are each selectively connected to the second protection module 520B by respective switch modules 510-1B, 510-2B, . . . , and 510-KB.

The protection modules 520 provide power to the pacemaker system 500. Because both protection modules 520 are connected to the selected control module 408, if one protection module 520 fails, the other can be used. If one of the switch modules 510 fails, the other protection module 520 can be used. Furthermore, if for example switch modules 510-1A and 510-2B both fail, both protection modules 520 can be used to allow access to both batteries 450-1 and 450-2.

The control modules 408 may selectively monitor current flowing through the switch modules 510 and/or protection modules 520 to determine when to selectively connect and/or disconnect batteries 450. The control modules 408 may also selectively limit current flowing from the batteries 450 using the protection modules 450, possibly in a manner similar to that described above with respect to FIGS. 16A-16C.

In another implementation, each battery 450 may have a measurement module (not shown) that measures current and/or voltage of the respective battery 450. This information may be transmitted to the control modules 408. Each battery 450 may additionally have an associated protection module (individual versions of the protection modules 520) to individually limit its current. The control modules 408 in FIG. 18 can also operate in a watchdog processing mode as described above.

Figure 19B:
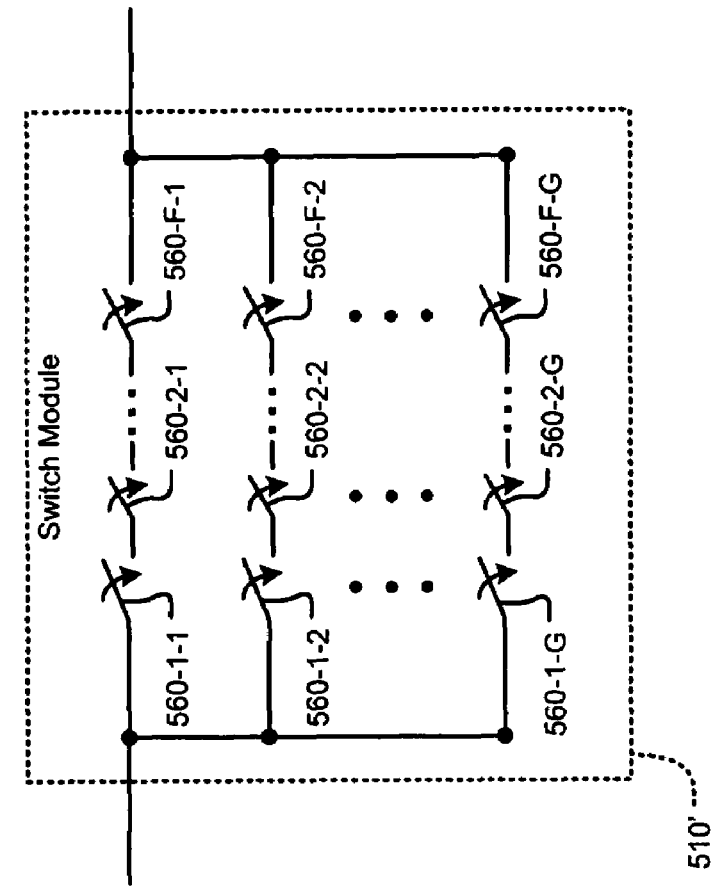
FIGS. 19A-19C are functional block diagrams of an exemplary switch modules.
Figure 19A:
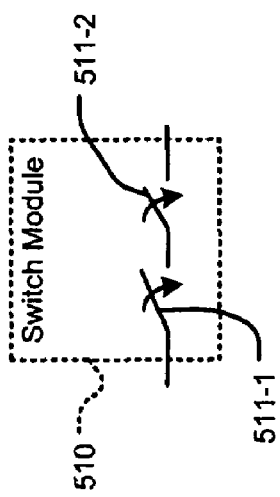
Figure 19C:
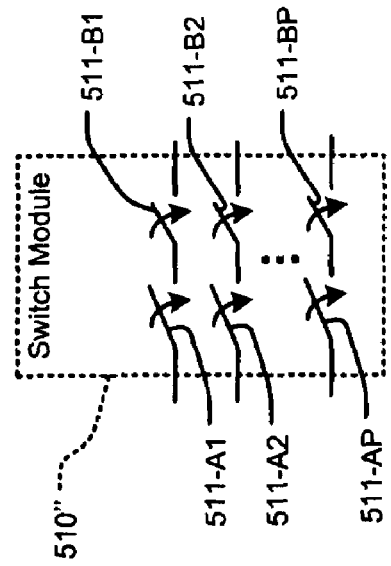

Referring now to FIGS. 19A-19C, exemplary redundant switch modules 510, 510' and 510" are shown. In FIG. 19A, the redundant switch module 510 includes first and second switch modules 511-1 and 511-2 that are connected in series. In FIG. 19B, the redundant switch module 510' includes an F by G array of switch modules 560, where F and G are integers greater than one. For example, F and G may both be equal to 2. The F switch modules 560-1-$x$, 560-2-$x$, . . . , and 560-F-$x$ are connected in series with one another. This is true for each $x$ from 1 to G. The G sets of F switch modules are connected in parallel with each other. This built-in redundancy increases reliability. In FIG. 19C, N switch modules 510 are combined to provide multiple line switch modules 510". While specific examples of the switch modules are shown, the switch modules may include one or more switches connected in any suitable configuration.

Figure 20:
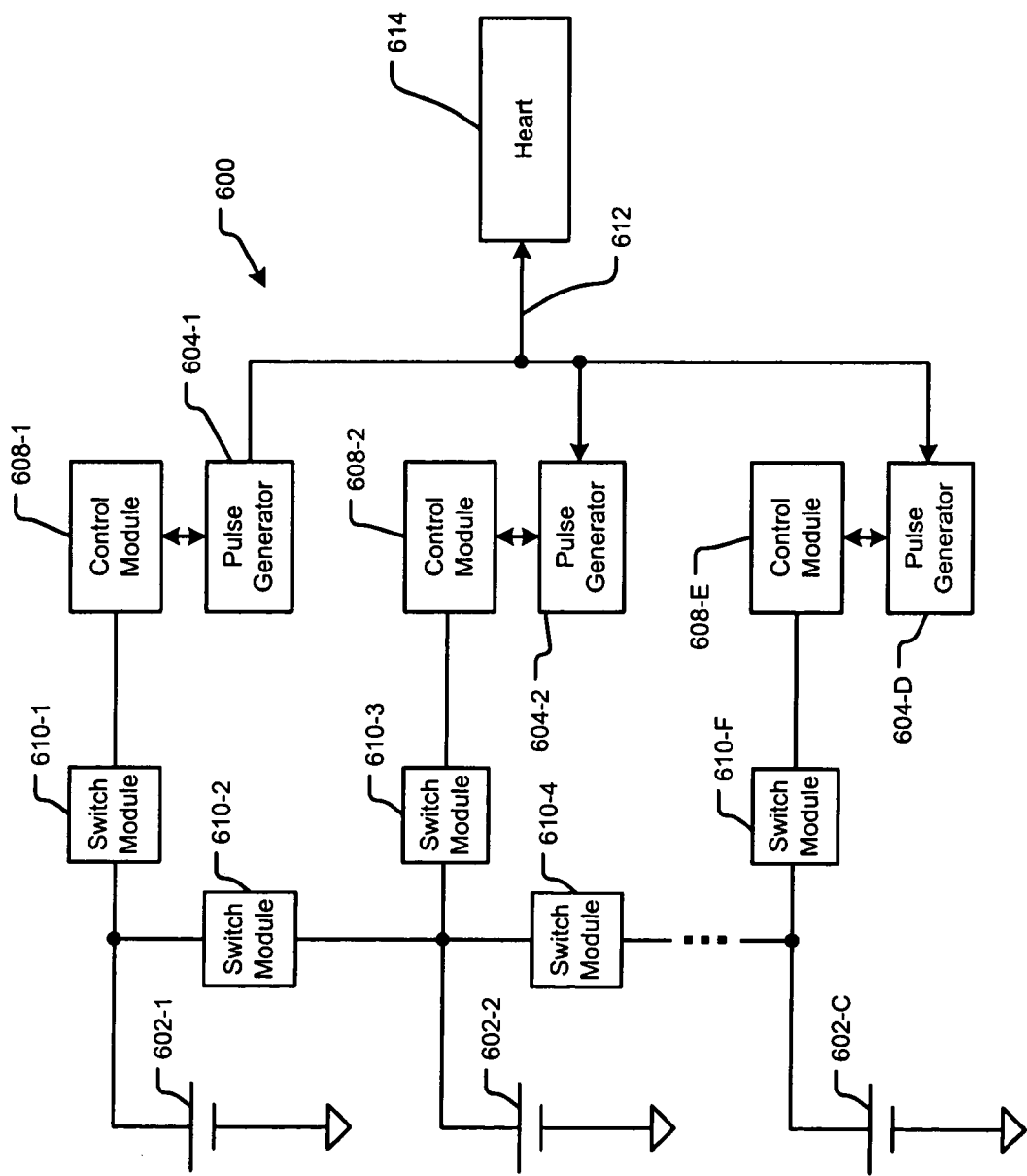
FIG. 20 is a functional block diagram of an alternate power delivery system for a medical device.
Figure 21:
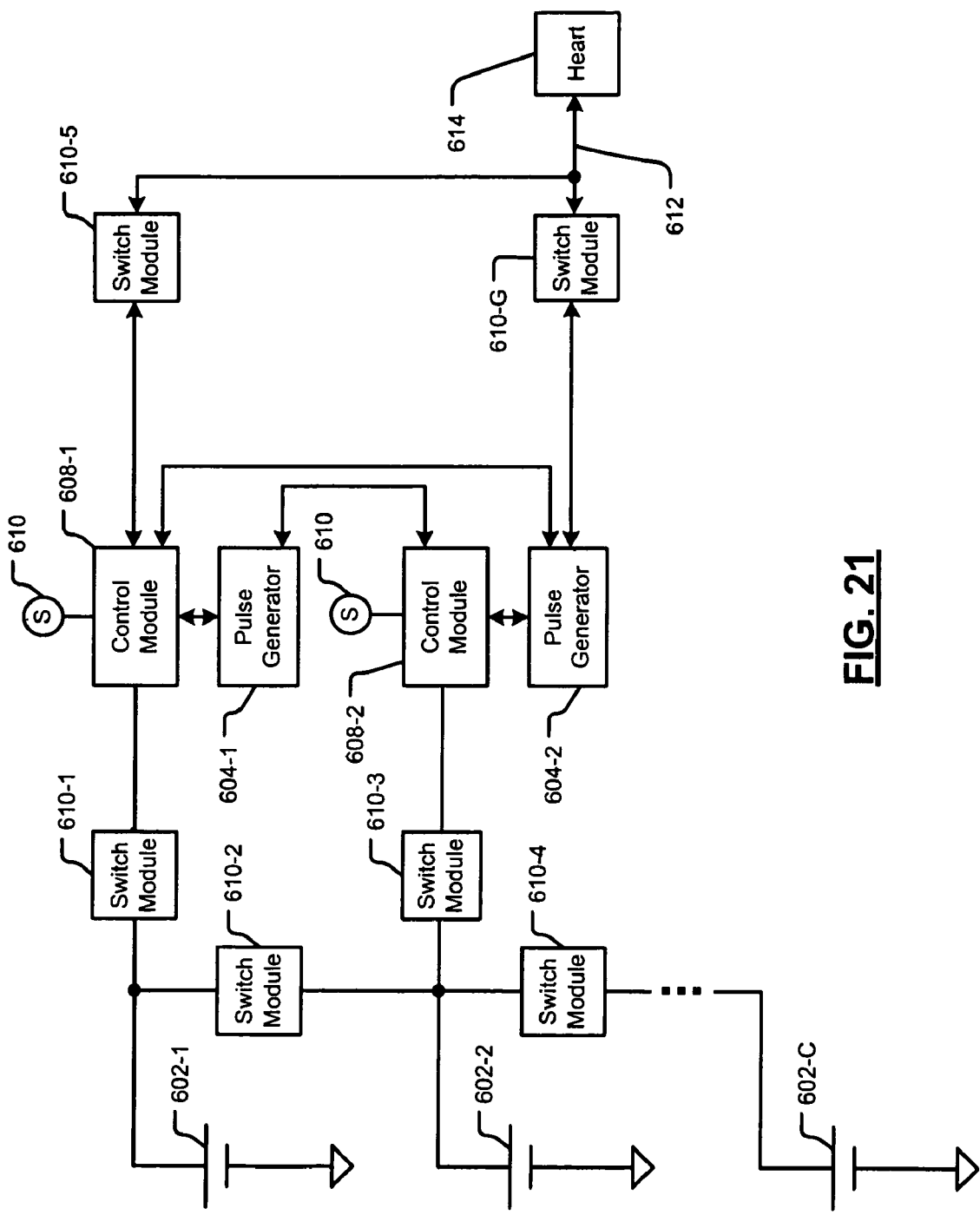
FIG. 21 is a functional block diagram of an alternate power delivery system for a medical device.

Referring now to FIGS. 20 and 21, a medical device such as a pacemaker system 600 is shown. The pacemaker system 600, which is fully redundant, includes batteries 602-1, 602-2, . . . , and 602-C (collectively batteries 602), pulse generators 604-1, 604-2, . . . , and 604-D (collectively, pulse generators 604), control modules 608-1, 608-2, . . . , and 608-E (collectively, control modules 608), switch modules 610-1, 610-2, . . . , and 610-F, and one or more leads 612 connected to a patient's heart 614.

When one of the batteries 602 fails, another of the batteries 602 can be connected using switch modules 610. When one of the pulse generators 604 or control modules 608 fails, another of the control modules 608 and/or pulse generators 604 can be connected using the switch modules 610. Additional levels of redundancy can be added using additional switch modules 610-1, 610-2, . . . , and 610-G as shown in FIG. 21.

As can be appreciated, the number of control modules, pulse generators, batteries and switch module can be varied depending upon the particular application.

While this invention has been described in connection with particular examples thereof, the true scope of the invention should not be so limited since other modifications will become apparent to the skilled practitioner upon a study of the drawings, the specification and the following claims.

What is claimed is:

1. A medical device comprising:
   a pulse generator that selectively generates pulses;
   M control modules that selectively control said pulses, where M is an integer greater than one;
   a power distribution system that supplies power to said medical device and that comprises:
      N batteries, where N is an integer greater than one;
      a common node; and
      N protection modules that selectively disconnect a first one of said N batteries from said common node and selectively connects a second one of said N batteries to said common node based on control signals from said M control modules and that monitor current provided by each of said N batteries; and
   first switch modules that select any one of said M control modules and connect said selected one of said M control modules to any one of said N protection modules,
   wherein said M control modules generate said control signals based upon said current.

2. The medical device of claim 1, wherein said first switch modules selectively connect said common node to said pulse generator and said M control modules.

3. The medical device of claim 2, wherein the first switch modules comprise redundant switch modules.

4. The medical device of claim 1, wherein said medical device comprises a pacemaker system and said pulses include heart pacing pulses.

5. The medical device of claim 1, wherein said first switch modules selectively connect one of said N control modules to said pulse generator.

6. The medical device of claim 5, wherein said pulse generator comprises P pulse generators and said medical device further comprises second switch modules that selectively connect one of said P pulse generators to said one of said M control modules, where P is an integer greater than one.

7. The medical device of claim 6, further comprising:
   leads; and
   third switch modules that selectively connect said one of said P pulse generators to said leads.

8. The medical device of claim 1, wherein each of said N protection modules monitor current provided by a respective one of said N batteries, and
   wherein said M control modules generate said control signals based on said current from each of said N batteries.

9. The medical device of claim 1, wherein said common node is connected between said pulse generator and said N protection modules.

10. The medical device of claim 1, wherein said N protection modules decrease current flow through one of said N batteries when current through said one of said N batteries is greater than a threshold.

11. The medical device of claim 1, wherein said M control modules test one of said N batteries before connection with said common node.

12. The medical device of claim 11, wherein said M control modules selectively connect said one of said N batteries based on state of charge of said one of said N batteries.

13. The medical device of claim 1, further comprising a backup control module that diagnoses operability of said M control modules and that selectively disconnects and selectively connects said N batteries to said common node based on said diagnoses of said operability of said M control modules.

14. The medical device of claim 1, wherein each of said N protection modules comprises a current limiting module.

15. The medical device of claim 14, wherein said current limiting module comprises X transistors that are connected in parallel, where X is an integer greater than one, and wherein control terminals of said X transistors communicate with said M control modules.

16. The medical device of claim 14, wherein said current limiting module comprises:
   a resistance element; and
   a switch that is connected in parallel with said resistance element and that is selectively controlled by said M control modules.

17. The medical device of claim 16, wherein said resistance element comprises a variable resistance element and wherein said M control modules selectively vary a resistance of said variable resistance element.

18. The medical device of claim 14, wherein said current limiting module decrease current flow through one of said N batteries when current through said one of said N batteries is greater than a threshold.

19. A medical device comprising:
   pulse generating means for selectively generating pulses;
   M control means for selectively controlling said pulses, where M is an integer greater than one; and
   power distribution means comprising:
      N charge storing means for delivering current, where N is an integer greater than one;
      a common node; and
      N protection means for selectively disconnecting a first one of said N batteries from said common node, for selectively connecting a second one of said N charge storing means to said common node based on respective control signals from said M control means, and for monitoring current flowing through each of said N charge storing means; and
   first switch means for selecting any one of said M control means and for connecting said selected one of said M control means to any one of said N protection means,
   wherein said M control means selectively generate said control signals based upon said current flowing through said N charge storing means.

20. The medical device of claim 19, further comprising first switching means for selectively connecting said common node to said pulse generator and said M control modules.

21. The medical device of claim 19, wherein said medical device comprises a pacemaker system and said pulses include heart pacing pulses.

22. The medical device of claim 19, wherein said first switching means selectively connects one of said M control means to said pulse generating means.

23. The medical device of claim 22, wherein said pulse generating means comprises P pulse generating means and said medical device further comprises second switching means for selectively connecting one of said P pulse generating means to said one of said M control means, where P is an integer greater than one.

24. The medical device of claim 23, further comprising:
   leads; and
   third switching means for selectively connecting one of said P pulse generating means to said leads.

25. The medical device of claim 19, wherein each of said N protection means comprises current limiting means for limiting current.

26. The medical device of claim 25, wherein each of said current limiting means comprises X transistors that are connected in parallel, where X is an integer greater than one, and wherein control terminals of said X transistors communicate with said M control means.

27. The medical device of claim 25, wherein said current limiting means comprises:
   resistance means for providing resistance; and
   switch means for switching that is connected in parallel with said resistance means and that is selectively controlled by said M control means.

28. The medical device of claim 27, wherein said resistance means comprises variable resistance means for providing a variable resistance and wherein said M control means selectively varies a resistance of said variable resistance means.

* * * * *